(12) United States Patent
Singh et al.

(10) Patent No.: US 12,464,247 B2
(45) Date of Patent: Nov. 4, 2025

(54) DEVICE AND METHOD FOR SURROUND VIEW CAMERA SYSTEM

(71) Applicant: Robert Bosch GmbH, Stuttgart (DE)

(72) Inventors: Vicky Ranveer Singh, Canton, MI (US); William Hallendy, Chesterfield, MI (US); Vincent Le, Dearborn, MI (US)

(73) Assignee: Robert Bosch GmbH, Stuttgart (DE)

( * ) Notice: Subject to any disclaimer, the term of this patent is extended or adjusted under 35 U.S.C. 154(b) by 132 days.

(21) Appl. No.: 18/468,322

(22) Filed: Sep. 15, 2023

(65) Prior Publication Data

US 2025/0095223 A1  Mar. 20, 2025

(51) Int. Cl.

| | |
|---|---|
| H04N 23/698 | (2023.01) |
| G06T 3/4038 | (2024.01) |
| G06T 7/20 | (2017.01) |
| G06T 7/70 | (2017.01) |
| G06T 11/00 | (2006.01) |
| B60R 1/24 | (2022.01) |
| B60R 1/26 | (2022.01) |

(52) U.S. Cl.
CPC ......... *H04N 23/698* (2023.01); *G06T 3/4038* (2013.01); *G06T 7/20* (2013.01); *G06T 7/70* (2017.01); *G06T 11/00* (2013.01); *B60R 1/24* (2022.01); *B60R 1/26* (2022.01); *B60R 2300/105* (2013.01); *B60R 2300/30* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 6,172,601 B1 | 1/2001 | Wada et al. | |
| 8,295,644 B2 | 10/2012 | Shulman et al. | |
| 2003/0165255 A1* | 9/2003 | Yanagawa | B60R 1/27 382/104 |

(Continued)

FOREIGN PATENT DOCUMENTS

JP  2002-373327  12/2002

OTHER PUBLICATIONS

Morozov Automotive, Bird's Eye View Backup System With Just One Camera, ATOTO AC-HD03, Youtube, Aug. 30, 2020, https://www.youtube.com/watch?v=oFqOqVP4ZTU.

*Primary Examiner* — Talha M Nawaz
(74) *Attorney, Agent, or Firm* — Maginot, Moore & Beck LLP

(57) ABSTRACT

A method of operating a surround view camera system for a vehicle includes generating first image data at a first time using an imaging device, the first image data corresponding to a first image of a surroundings of the vehicle, and receiving first vehicle data generated by at least one sensor of the vehicle with a processor, the first vehicle data generated at the first time. The method further includes generating second image data at a second time after the first time using the imaging device, the second image data corresponding to a second image of the surroundings of the vehicle, and receiving second vehicle data generated by the at least one sensor with the processor, the second vehicle data generated from the first time to the second time. The method also includes processing the first vehicle data and the second vehicle data using the processor to determine change data.

18 Claims, 6 Drawing Sheets

(56) References Cited

U.S. PATENT DOCUMENTS

2021/0039555 A1* 2/2021 Lynam ................... H04N 23/69
2023/0166659 A1* 6/2023 Hariyani ................. B60R 1/27
                                                        348/148

* cited by examiner

DEVICE AND METHOD FOR SURROUND VIEW CAMERA SYSTEM

FIELD

This disclosure relates to the field of camera systems for vehicles and, in particular, to generating images of the surroundings of a vehicle to assist with operating the vehicle.

BACKGROUND

Vehicles, such as passenger cars, trucks, and commercial vehicles, typically include at least one camera mounted on a body of the vehicle. For example, most passenger cars include a rearview camera mounted on a rear side of the vehicle, such as near the vehicle registration plate. Typically, the rearview camera is activated during reversing of the vehicle and results in a rear view image directly behind the vehicle being shown on a display in the cabin of the vehicle. The operator may choose to view the display during reversing of the vehicle to assist with maneuvering the vehicle into a parking spot and/or to avoid obstacles located behind the vehicle.

The typical rearview camera system, however, has somewhat limited functionality, in that only the space behind the vehicle is shown on the vehicle display screen. To address this deficiency, some automakers and original equipment manufacturers (OEMs) have developed surround view camera systems that utilize four or more cameras to generate a composite image that corresponds to a top-down view of the vehicle. The top-down view is also referred to as a bird's eye and a 360° view. As indicated by the names, this system shows the space near the front side, the left side, the right side, and the rear side of the vehicle. In practice, surround view camera systems are useful to vehicle operators because frequently, even when reversing a vehicle it is useful to know if there are any obstacles near the front of vehicle. For example, surround view camera systems can enable some vehicle operators to parallel park with greater efficiency and comfort.

As noted, the typical surround view camera system includes at least four cameras separately mounted at the front side, the left side, the right side, and the rear side of the vehicle. Images from each of the four cameras are then stitched together by an image processing system to generate the surround view. While such a system works well to generate the surround view, it requires lots of hardware and, therefore, is an expensive solution to the problem of providing vehicle operators with an image of the vehicle surroundings. For example, each of the four cameras must be mounted and integrated into a corresponding part of the vehicle, such as the side mirrors, the front fenders, the grill, the upper windshield area, and/or the trunk panel. Each of these integrations is a specialized design, and wiring from each of the cameras must be routed to a bus line and/or a corresponding controller.

Accordingly, based on the above, an alternative solution is desirable that reduces design, manufacturing, and hardware costs, but that provides the advantages of a multi-camera surround view camera system.

SUMMARY

According to an exemplary embodiment of the disclosure, a method of operating a surround view camera system for a vehicle includes generating first image data at a first time using an imaging device operably connected to the vehicle. The first image data corresponds to a first image of a surroundings of the vehicle. The method receives first vehicle data generated by at least one sensor mounted on the vehicle with a processor. The first vehicle data is generated at the first time. The method further includes generating second image data at a second time after the first time using the imaging device. The second image data corresponds to a second image of the surroundings of the vehicle. The method receives second vehicle data generated by the at least one sensor with the processor. The second vehicle data is generated from the first time to the second time. The method also includes processing the first vehicle data and the second vehicle data using the processor to determine change data corresponding to a change in position of the vehicle from the first time to the second time. The method generates composite image data using the processor by (i) moving, rotating, and/or scaling the first image based on the change in position of the vehicle to generate a changed first image as represented by changed first image data, and (ii) combining the changed first image data with the second image data. The method displays a surround view image from the composite image data on a display screen of the vehicle.

According to another exemplary embodiment of the disclosure, a surround view camera system for a vehicle includes an imaging device, a sensor, a display screen, and a processor. The imaging device is mounted on the vehicle and is configured to generate first image data at a first time. The first image data corresponds to a first image of a surroundings of the vehicle. The imaging device is configured to generate second image data at a second time after the first time. The second image data corresponds to a second image of the surroundings of the vehicle. The sensor is mounted on the vehicle and is configured to generate first vehicle data at the first time and second vehicle data at the second time. The display screen is mounted on the vehicle. The processor is operably connected to the imaging device, the sensor, and the display screen. The processor is configured to receive the first vehicle data and the second vehicle data, and to process the first vehicle data and the second vehicle data to determine change data corresponding to a change in position of the vehicle from the first time to the second time. The processor is further configured to receive the first image data and the second image data, and to generate composite image data by (i) moving, rotating, and/or scaling the first image based on the change in position of the vehicle to generate a changed first image as represented by changed first image data, and (ii) combining the changed first image data with the second image data. The processor is further configured to transmit the composite image data to the display screen. A surround view image from the composite image data is displayed on the display screen of the vehicle.

According to yet another exemplary embodiment of the disclosure, a method of operating a surround view camera system for a vehicle includes generating first image data at a first time using an imaging device operably connected to the vehicle. The first image data corresponds to a first image of a surroundings of the vehicle. The method generates second image data at a second time after the first time using the imaging device. The second image data corresponds to a second image of the surroundings of the vehicle. The method further includes receiving vehicle data generated by at least one sensor mounted on the vehicle with the processor. The vehicle data is generated from the first time to the second time. The method processes the vehicle data using the processor to determine position data corresponding to a change in position of the vehicle from the first time to the second time. The method also includes generating composite image data using the processor by (i) moving, rotating, and/or scaling the first image based on the position data to generate a changed first image as represented by changed first image data, and (ii) combining the changed first image data with the second image data. The method displays a surround view image from the composite image data on a display screen of the vehicle.

BRIEF DESCRIPTION OF THE FIGURES

The above-described features and advantages, as well as others, should become more readily apparent to those of ordinary skill in the art by reference to the following detailed description and the accompanying figures in which.

DETAILED DESCRIPTION

Figure 1:
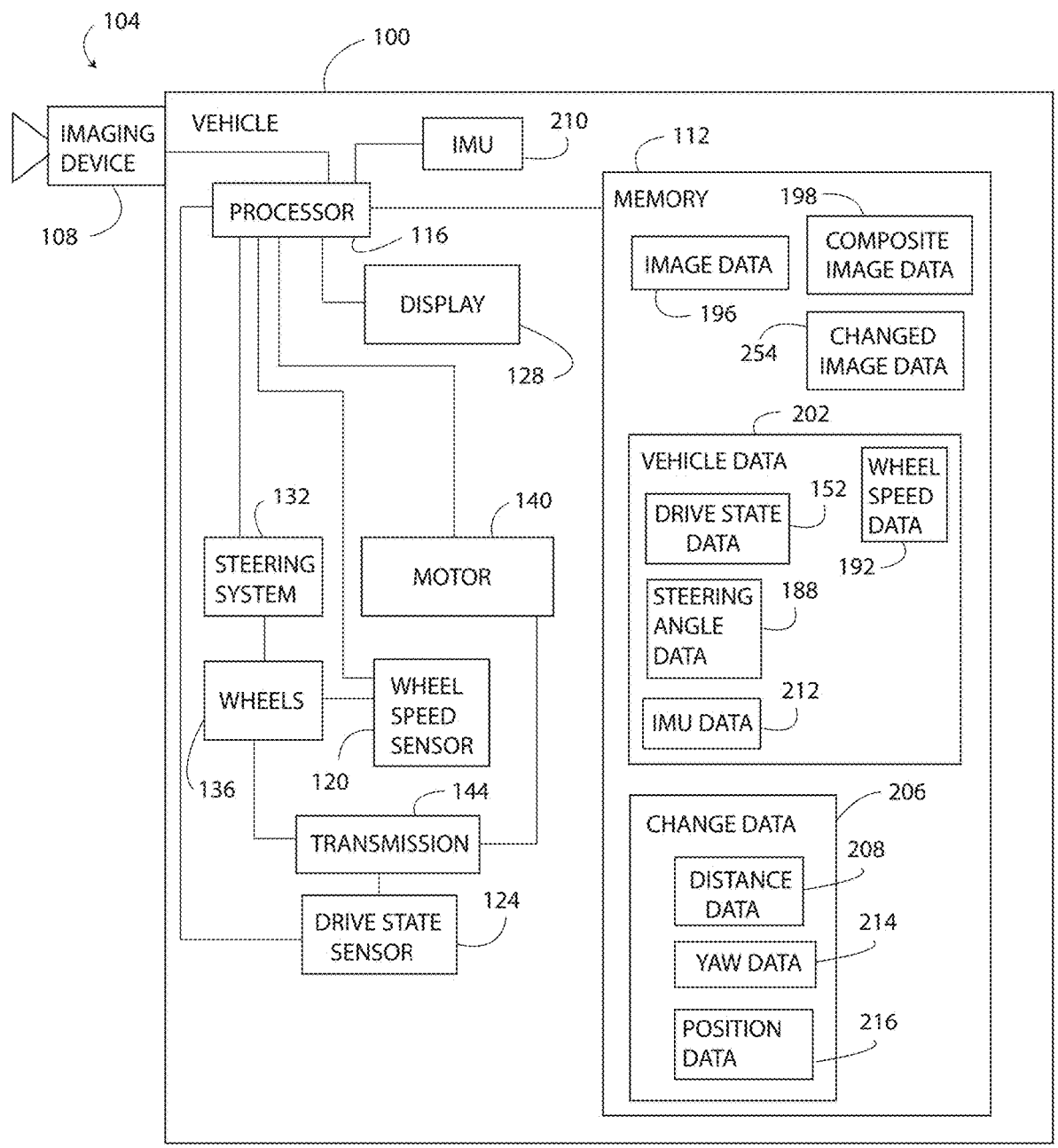
FIG. 1 is a block diagram of a vehicle including surround view camera system, as disclosed herein.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

Aspects of the disclosure are disclosed in the accompanying description. Alternate embodiments of the disclosure and their equivalents may be devised without parting from the spirit or scope of the disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

For the purposes of the disclosure, the phrase "A and/or B" means (A), (B), or (A and B). For the purposes of the disclosure, the phrase "A, B, and/or C" means (A), (B), (C), (A and B), (A and C), (B and C), or (A, B and C).

The terms "comprising," "including," "having," and the like, as used with respect to embodiments of the disclosure, are synonymous.

As shown in FIG. 1, a vehicle 100 includes a surround view camera system 104 having an imaging device 108, a memory 112, a processor 116, vehicle sensors 120, 124, and a display screen 128 located within a cabin of the vehicle 100. The vehicle 100 further includes a steering system 132 for steering at least two wheels 136 of the vehicle 100 (see also FIG. 2), and a motor 140 and a transmission 144 for generating and delivering a force for moving the vehicle 100 to at least one of the wheels 136.

The surround view camera system 104 generates images 220 (FIG. 4A) of the surroundings of the vehicle 100 and intelligently combines the images 220 based on vehicle data 202 corresponding to movement of the vehicle 100. The vehicle data 202 is generated by the vehicle sensors 120, 124. The combined images 220 are a surround view image 224 (FIGS. 4B and 4C), which also referred to as a composite image and/or a bird's eye view. The surround view image 224 is shown on the display screen 128, and represents a top-down view of the surroundings of the vehicle 100 from the front, sides, and rear of the vehicle 100. The operator of the vehicle 100 uses the surround view image 224 (as shown on the display screen 128) to assist in maneuvering the vehicle 100 around obstacles 228 and into a parking area 230, for example.

As described herein, the surround view camera system 104 requires only one imaging device 108 and generates the surround view image 224 from only the one imaging device 108 in real-time as the vehicle 100 is moved at any selected speed and in any direction. Thus, the surround view camera system 104 is a cost-effective solution to provide an operator of a vehicle 100 with a bird's eye view using less hardware and resources than prior art solutions, which typically require four or more imaging devices and completed design integrations. The surround view camera system 104 generates the surround view image 224 very accurately by using the vehicle data 202 from at least the sensors 120, 124 to determine how the images 220 should be combined. Each component of the surround view camera system 104 and the vehicle 100 is described below.

The vehicle 100, in one embodiment, is a passenger vehicle that may be occupant controlled (i.e., levels zero through four autonomous control). Additionally or alternatively, the vehicle 100 is fully-autonomously controlled (i.e., level five autonomous control), and can be switched to a mode in which an operator controls the movement of the vehicle 100 from either within the vehicle cabin or from a remote location outside of the vehicle cabin. For example, the vehicle 100 is provided as a personal vehicle, a rental car, a shuttle, a limousine, a corporate vehicle, a livery vehicle, a taxi, or a robo-taxi. The vehicle 100 is inclusive of any ground-based means of carrying or transporting something or someone, including automobiles, trucks, and tractors. The vehicle 100 includes road-going vehicles, private vehicles, commercial vehicles, off-road vehicles, recreational vehicles, and agricultural vehicles.

With reference to FIG. 1, the motor 140 is an electric motor that is also referred as a traction motor. An output shaft (not shown) of the motor 140 is operably connected to the transmission 144 for transmitting torque to the transmission. In the illustrated embodiment, the motor 140 is a three-phase AC induction motor, but in other embodiments, the motor 140 is any suitable electric motor such as a brushless DC motor or a permanent magnet synchronous motor. Thus, in one embodiment, the vehicle 100 is a fully-electric vehicle. In another embodiment, the vehicle 100 also includes a combustion engine (not shown) operably connected to the transmission 144 and the electric motor 140, and the vehicle 100 is referred as a hybrid-electric vehicle. In yet another embodiment, the motor 140 includes only a combustion engine.

The transmission 144 of the vehicle 100 refers to the mechanical system for transferring torque from the motor 140 to the drive wheel(s) 136 to propel the vehicle 100 in either the forward direction or the reverse direction. In one embodiment, the transmission 144 is a one-speed transmission as is found in some electric vehicles. In other embodiments, the transmission 144 is a multi-speed automatic or manual transmission that includes multiple gears for moving the vehicle 100 in the forward direction, as is typically included with combustion engine vehicles.

The transmission 144, in one embodiment, has a park mode, a reverse mode, a neutral mode, and a drive mode, which are referred to collectively as drive states of the transmission 144. In the park mode, the transmission 144 is locked to hold the vehicle 100 in a stationary position, under most circumstances. In the reverse mode, the transmission 144 couples the motor 140 to the drive wheel(s) 136 in a manner that causes torque from the motor 140 to rotate the drive wheel(s) 136 in a direction that reverses the vehicle 100 (i.e., a reverse direction of movement). In the neutral mode, the transmission 144 decouples the motor 140 from the drive wheel(s) 136, such that the wheels 136 are free to rotate without connection to the motor 140. In the drive mode, the transmission 144 couples the motor 140 to the drive wheel(s) 136 in a manner that causes torque from the motor 140 to rotate the drive wheel(s) 136 in a direction that moves the vehicle 100 in a forward direction (i.e., a forward direction of movement).

As shown in FIG. 1, the drive state sensor 124 is operably connected to the transmission 144 for detecting the current drive state. The drive state sensor 124 generates drive state data 152 in real time, which corresponds to the presently-selected drive state of the transmission 144. The drive state data 152 indicates when the vehicle 100 is in the park mode, the reverse mode, the neutral mode, and the drive mode. The drive state data 152 is stored in the memory 112. In another embodiment, the drive state data 152 is generated by any other corresponding vehicle component and is provided to the processor 116 for storage in the memory 112.

Figure 2:
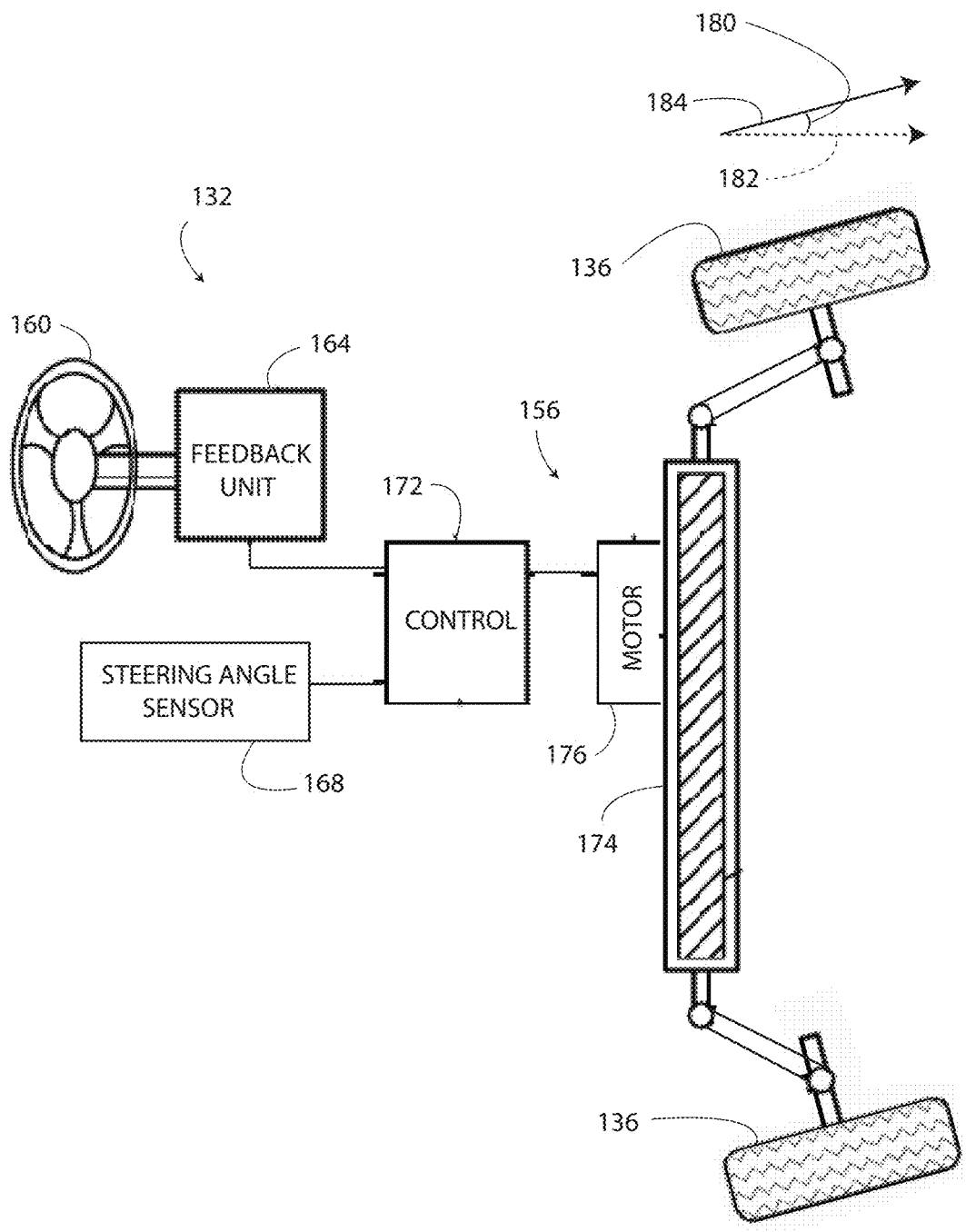
FIG. 2 is a block diagram of a steering system of the vehicle of FIG. 1 illustrating a steering angle of the vehicle wheels.

With reference to FIG. 2, the steering system 132 and the front wheels 136 of the vehicle 100 are shown in greater detail. The steering system 132 is shown as a simplified steer-by-wire system, but may alternatively be provided as a typical mechanically operated power steering system. The steering system 132 has an operational connection to at least two of the wheels 136 (the front wheels 136 in this example) and is provided for influencing a travel direction of the vehicle 100. The steering system 132 includes a steering actuator 156, a steering handle 160, a feedback unit 164, and an angle sensor 168 each operatively connected to an electronic steering controller 172.

The steering actuator 156 has an operational and mechanical connection to the two front wheels 136. The steering actuator 156 is shown as including a toothed steering rack 174 and a steering motor 176 for moving the steering rack 174. The steering actuator 156 is configured to convert a steering specification received from the steering controller 172 into a steering movement of the wheels 136 and in this way changes a travel direction of the vehicle 100 when the vehicle 100 is moving.

The steering handle 160 is shown as a steering wheel operatively connected to the feedback unit 164. Rotation of the steering handle 160 is sensed by the feedback unit 164 as a desired steering specification and is provided to the steering controller 172 as an electronic steering specification signal. In response, to receiving the electronic steering specification signal, the steering controller 172 the steering motor 176 to rotate, which causes movement of the steering rack 174. The movement of the steering rack 174 results in a changed steering angle 180 of the wheels 136 that are connected to the steering system 132.

In FIG. 2, the steering system 132 has turned the front wheels 136 to the left resulting in a steering angle 180 of about −15°, for example. The steering angle 180 is represented with a vehicle line 182 (dashed) and a wheel line 184 (solid). The vehicle line 182 is parallel to the vehicle body and is a reference line having a fixed position relative to the vehicle 100. The wheel line 184 corresponds to the rolling direction of the wheels 136 as controlled by the steering system 132 and is movable relative to the vehicle line 182 according to the selected steering position of the steering handle 160. When the wheel line 184 is aligned with the vehicle line 182, the steering angle 180 is zero degrees (0°), which causes the vehicle 100 to track in a straight line without turning. When the steering handle 160 is rotated to the left, as in FIG. 2, the wheel line 184 angles counter-clockwise from the vehicle line 182 and a negative steering angle 180 occurs. When the steering handle 160 is rotated to the right, the wheel line 184 angles clockwise from the vehicle line 182 and a positive steering angle occurs. Any other coordinate system may be used to quantify the steering angle 180, as is desired by those of skill in the art.

The angle sensor 168 is operatively connected to the steering controller 172 and is configured to generate steering angle data 188 (FIG. 1) in real time. The angle sensor 168 is another vehicle sensor. The steering angle data 188 corresponds to the current steering angle 180 of the vehicle 100. The steering angle data 188 is provided to the processor 116 and is stored in the memory 112. In another embodiment, the angle sensor 168 is connected to one of the steering motor 176 and the steering rack 174 of the steering actuator 156 for sensing the steering angle 180. The angle sensor 168 is configured to sense the steering angle 180 to generate the steering angle data 188 according to any desired approach.

With reference again to FIG. 1, the wheel speed sensor 120 is operatively connected to at least one of the vehicle wheels 136. The wheel speed sensor 120 is configured to generate wheel speed data 192 in real time. The wheel speed data 192 corresponds to a rotational speed of the monitored wheel 136 and, thus, also corresponds to a speed of the vehicle 100 in most conditions (i.e., a vehicle speed). The wheel speed sensor 120 may be connected to a non-driven wheel 136. In an exemplary embodiment, the wheel speed data 192 indicates the rotation of the monitored wheel 136 in rotations per minute (rpm), degrees per second, or any other unit of measurement. Positive wheel speed data 192 indicates that the vehicle 100 is moving in a forward direction, and negative wheel speed data 192 indicates that the vehicle is moving in a reverse direction. The wheel speed sensor 120, in one embodiment, is included an antilock braking system of the vehicle 100 and/or a vehicle stability control system of the vehicle 100.

The processor 116 is configured to generate distance data 208 based on the wheel speed data 120. The distance data 208 corresponds to how far the vehicle 100 has moved on the ground. The distance data 208 is determined similarly or the same as odometry data of the vehicle 100 is determined. Odometry data is shown in an odometer portion of the vehicle 100 dashboard, for example. In some embodiments, however, the distance data 208 is more accurately determined than the odometry data. For example, by using the wheel speed data 192 and a known diameter of the wheel (and tire), the processor 116 can determine distance data 208 accurate to within a centimeter or less. In other embodiments, the distance data 208 is determined from ultrasonic data generated by an ultrasonic sensor(s) (not shown) of the vehicle 100 as the vehicle 100 is moved. If equipped, the ultrasonic sensor is another vehicle sensor. The vehicle 100 may include ultrasonic sensors as part of an obstacle detection system. The distance data 208 may additionally or alternatively be determined according to any other approach.

Figure 4A:
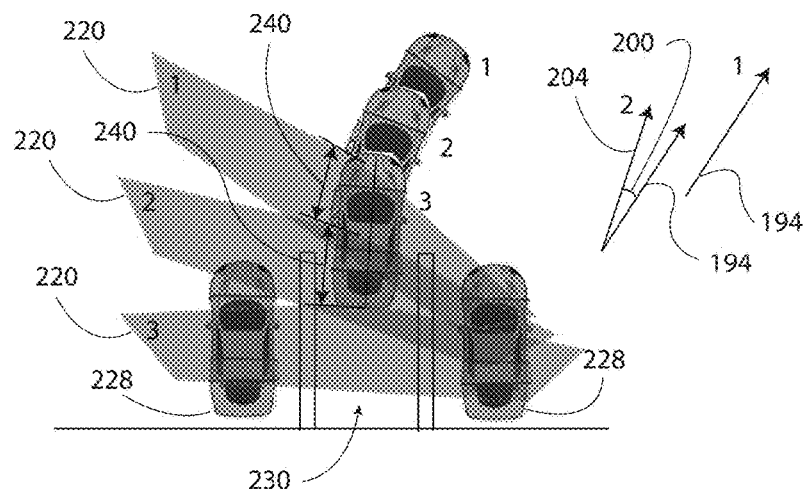
FIG. 4A is a top view block diagram of a vehicle that has reversed a distance along a curved path and three images generated from an imaging device of the surround view camera system of FIG. 1.

The processor 116 is further configured to generate yaw data 214 that is based on a rotational position of the vehicle 100 about a yaw axis. The yaw axis extends vertically through the vehicle 100. The yaw data 214 is stored in the memory 112. For example, FIG. 4A shows the vehicle 100 in three positions (1, 2, and 3) as the vehicle 100 is reversing into a parking area 230. At each position the vehicle 100 has a different yaw position. The yaw position is the rotational position about the yaw axis of the vehicle 100.

As shown in FIG. 4A, at the first position, a reference yaw position 194 is assigned to the vehicle 100 by the surround view camera system 104. When the vehicle 100 reaches the second position, the processor 116 determines the new yaw position 204 using, for example, the steering angle data 188 and the distance data 208. That is, by knowing how far the vehicle 100 has moved and with what steering angle 180, the processor 116 determines the new yaw position 204. Then, the processor 116 determines the change in yaw position 200 by comparing the new yaw position 204 to the reference yaw position 194. The reference yaw position 194, the new yaw position, and the change in yaw position 200 are stored as the yaw data 214. Thus, the yaw data 214 represent an angle that the vehicle 100 has rotated in moving from the first position to the second position. This process is repeated so that the yaw position 204 of the vehicle 100 is known at each position in which an image 220 is generated. The images 220 are also referred to herein as snapshots.

It is noted that in other embodiments, the vehicle 100 may include a yaw rate sensor (not shown) as part of a vehicle stability control system (not shown). The output of the yaw rate sensor may also be used to determine the yaw data 214, in addition to or in alternative to the steering angle data 188 and the distance data 208. The yaw rate sensor continuously outputs the yaw position 204 and/or the yaw rate of the vehicle 100 in real time as an electronic data signal. In such an embodiment, the yaw position 204 is stored in the memory 112 as the yaw data 214 for each position of the vehicle 100 that one of the images 220 is generated.

With reference to FIG. 1, the processor 116 is configured to generate change data 206 based on the vehicle data generated by the vehicle sensors 120, 124, 168. The change data 206 corresponds to a change in position of the vehicle 100 at each position that one of the images 220 is generated by the imaging device 108. The change data 206 may include position data 216 that corresponds to the position of the vehicle 100 on a selected coordinate system when the images 220 are taken. The change data 206 is stored in the memory 112. For example, the change data 206 includes the distance data 208 and the yaw data 214 so that the processor 116 can determine the position data 216 corresponding to how far and with what yaw angle the vehicle 100 has moved from each position at which an image 220 is generated. Any other data to determine an accurate position of the vehicle 100 may also be included in the change data 206, such as compass heading data of the vehicle 100, as may be provided by an electronic compass sensor of the vehicle 100 (i.e., another vehicle sensor).

In one embodiment, the position data 216 corresponds to the position of the vehicle 100 on a two-dimensional coordinate system (i.e., an x-y coordinate system). This positioning approach is used to determine positions at which the images 220 were generated on the same two-dimensional coordinate system as shown in FIGS. 5-8, discussed further below. That is, this approach assigns an x-position and a y-position to each of the images 220 based on the change data 206.

In some embodiments, the vehicle 100 includes inertial measurement unit (IMU) 210 that is configured to generate speed data and rotation data (i.e., IMU data 212) that is used to arrive at the change data 206. That is, the IMU 210 does not generate the wheel speed data 192 and the steering angle data 188, but instead generates other data based on detected movements of the vehicle 100 that can be processed to arrive at the positioning data 216. The IMU 210 may be included in the stability control system of the vehicle 100, for example. The IMU 210 may include a multi-axis accelerometer and a gyroscope, for example, to generate an electronic output that is processed to arrive at the position data 216.

Referring again to FIG. 1, the imaging device 108 is a digital imaging device or digital camera configured to generate electronic image data 196 representing the surroundings of the vehicle 100. For example, the imaging device 108 includes a charge-coupled device (CCD) sensor that generates the image data 196 in response to image inputs in the form of light. The imaging device 108 is also referred to herein as a camera and/or a snapshot camera. The imaging device 108 is positioned so that a field of view of the imaging device 108 includes the surroundings of the vehicle 100. To this end, the imaging device 108 may be mounted on the front of the vehicle 100 so that the field of view includes the surroundings of the vehicle 100 encountered as the vehicle 100 moves in a forward direction. The imaging device 108 may also be mounted on the rear of the vehicle 100 so that the field of view includes the surroundings of the vehicle 100 encountered as the vehicle 100 moves in the reverse direction. In this embodiment, the images 220 are substantially the same as the images from a typical vehicle back-up camera. The imaging device 108 may be mounted in the cabin of the vehicle 100 and positioned so that the imaging device 108 receives image inputs through a window of the vehicle 100, such as through the front windscreen or the rear glass panel. Alternatively, the imaging device 108 may be mounted on the exterior of the vehicle 100 so that the imaging device 108 receives the image inputs directly. In this regard, the imaging device 108 may be mounted on the front side of the vehicle at the front grille near the registration plate, for example, or on the rear side of the vehicle at the deck lid or rear hatch (trunk) in the position of a typical automobile back-up camera near the registration plate. In other embodiments, the imaging device 108 may be mounted at any desired location on the vehicle 100 including both in cabin and exterior locations.

With reference again to FIG. 1, the display device 128, in one embodiment, is a liquid crystal display (LCD) panel configured to display text, images, video, and other visually comprehensible data. In one embodiment, the display device 128 is positioned in a center stack of the cabin of the vehicle 100 and may be shared with other functions of the vehicle 100, such as the stereo system and climate controls. The display device 128 is configured to display the surround view image 224 (FIGS. 4B and 4C) generated by the surround view camera system 104 in real time. Specifically, the display device 128 is configured to display the most currently-generated surround view image 224, so that the display device 128 displays a bird's eye video of the current surroundings of the vehicle 100 as the vehicle 100 is moved. The display device 128 may include a touch screen or other input device for receiving user inputs, such as a user input for activating the surround view camera system 104. The display device 128, in another embodiment, is any display as desired by those of ordinary skill in the art, including, but not limited to, an active-matrix organic light-emitting diode display. In an example, the display device 128 is the display screen of a smartphone (not shown) operably connected to the vehicle 100. The display device 128 may also be the display screen of a remote computer system (not shown) that is spaced apart from the vehicle 100 and electronically connected to the vehicle 100 through a wireless computer network and/or a cellular network. In such an embodiment, the vehicle 100 includes a transceiver for electronically communicating with the network.

The memory 112 is an electronic storage device that is configured to store at least the image data 196, composite image data 198 corresponding to the surround view image 224, the vehicle data 202, and the change data 206. The memory 112 is also referred to herein as a non-transient computer readable storage medium.

As shown in FIG. 1, the processor 116 is a structural device configured to execute program instructions in order to operate the surround view camera system 104 for generating the surround view image 224 on the display device 128. The processor 116 is provided as at least one microcontroller and/or microprocessor. The processor 116 may also be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor 116 may be any conventional processor, controller, microcontroller, or state machine. The processor 116 may also be implemented as a combination of computing devices, e.g., a combination of a DSP and a microprocessor, a plurality of microprocessors, one or more microprocessors in conjunction with a DSP core, or any other such configuration. In one embodiment, the processor 116 is provided as the electronic control unit (ECU) (not shown) of the vehicle 100, such that the ECU is used to generate the surround view image 224.

In FIG. 1, the processor 116 is connected directly to several of the vehicle components. In another embodiment the processor 116 and the vehicle components are each operatively connected to bus system (not shown) for the transfer of the data used to operate the vehicle 100 including the surround view camera system 104. An exemplary bus system is the controller area network bus (CAN bus).

Figure 3:
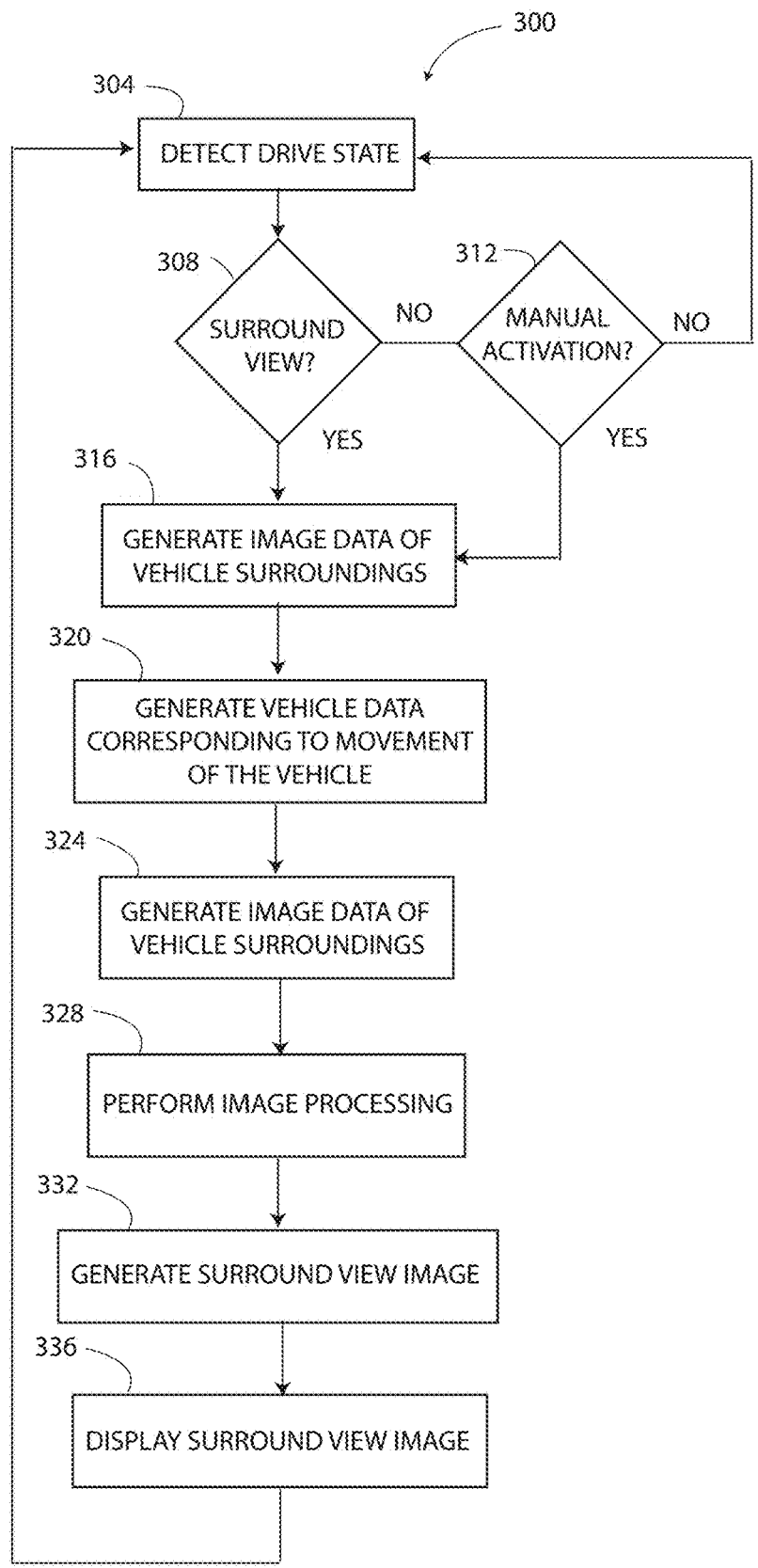
FIG. 3 is a flowchart illustrating an exemplary method of operating the surround view camera system of FIG. 1.

In operation, and with reference to the flowchart of FIG. 3, the surround view camera system 104 is configured to implement a method 300 of generating a continuously-updated surround view image 224 representing the surroundings of the vehicle 100 using only a single imaging device 108. As shown at blocks 304, 308, and 312, the method 300 begins with detecting the drive state of the vehicle 100 in order to determine the direction of movement of the vehicle 100 and to determine if the surround view camera system 104 should be activated to display the surround view image 224 on the display screen 128.

At block 304, the processor 116 detects the drive state of the vehicle 100 by processing the drive state data 152 generated by the drive state sensor 124. Typically, the surround view camera system 104 is automatically activated in a predetermined drive state of the vehicle 100. Activating the surround view camera system 104 includes generating the first image 220. For example, the surround view camera system 104 is automatically activated when the vehicle 100 is in the reverse mode, but is not automatically activated when the vehicle 100 is in drive mode. Thus, at block 308, when the processor 116 determines that the drive state data 152 indicates that the vehicle 100 is in reverse mode (or another predetermined drive state), the processor 116 activates the surround view camera system 104 for generating the surround view image 224. When, at block 308, the processor 116 determines that the drive state data 152 indicates that the vehicle 100 is not in the predetermined drive state, the processor 116 does not automatically activate the surround view camera system 104.

When the surround view camera system 104 is not automatically activated at block 308, at block 312, the processor 116 determines if the surround view camera system 104 has been manually activated. The surround view camera system 104 is manually activated in response to the user operating an input device associated with the display screen 128 or another input device operably connected to the vehicle 100. The surround view camera system 104 can be activated in any drive state of the vehicle 100.

Figure 4B:
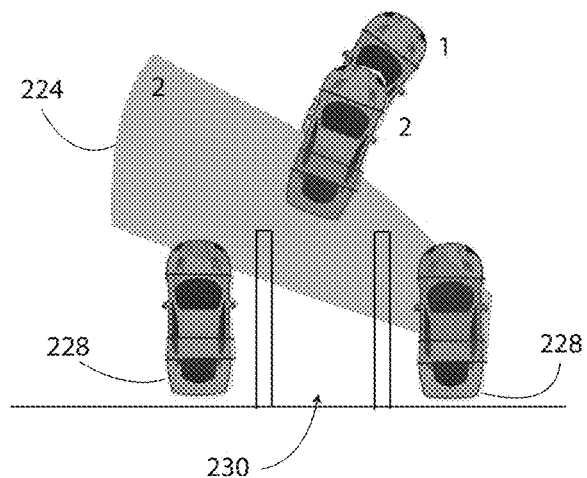
FIG. 4B is a top view block diagram of the vehicle of FIG. 4A in which two of the images have been combined by the surround view camera system of FIG. 1 into a surround view image.
Figure 4C:
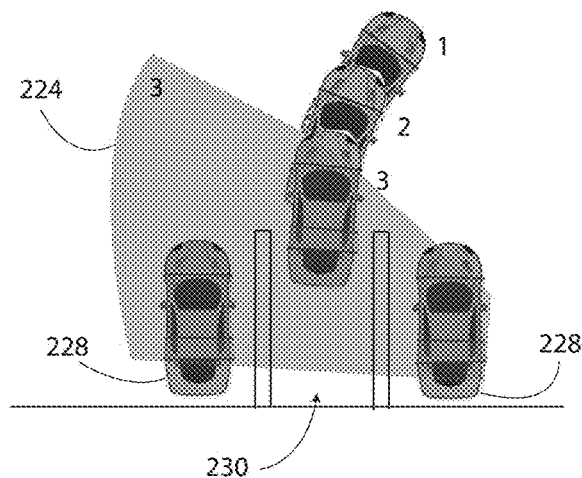
FIG. 4C is a top view block diagram of the vehicle of FIG. 4A in which three of the images have been combined by the surround view camera system of FIG. 1 into a surround view image.

Next, at block 316, and with reference to FIGS. 4A-4C, after being activated the surround view camera system 104 begins to generate the image data 196 using the imaging device 108. As noted above, FIG. 4A shows the vehicle 100 in three positions (1, 2, and 3) as the vehicle 100 is reversing into a parking area 230. Several obstacles 228, shown as other vehicles, are in adjacent parking areas. The first position is at a first time, the second position is at a second time after the first time, and the third position is at a third time after the second time. The first time corresponds to when the surround view camera system 104 is activated. At the first time, the surround view image 224 shown on the display screen 128 is based on first image data 196 generated with the vehicle 100 at the first position. The method 300 describes how the images 220 generated at the second time and the third time are combined with the image 220 at the first time to form the surround view image 224 using the vehicle data 202. That is, when the imaging device 108 is mounted on the rear side of the vehicle 100, the method 300 is an approach for combining the images from a vehicle back-up camera (i.e., images 220) in a manner that results in the surround view image 224 based on inputs from represented by the vehicle data 202.

At block 320 of FIG. 3 and with reference to FIGS. 4A and 4B, the vehicle 100 has reversed from the first position to the second position and vehicle data 202 has been generated during the movement of the vehicle 100. The processor 116 uses the vehicle data 202 to determine the change data 206 indicating the position of the vehicle 100 at the first and the second position, and the change in the vehicle position from the first position to the second position. As noted above, the processor 116 uses the wheel speed data 192, the steering angle data 188, and other vehicle data (if available) to determine the change data 206 The vehicle data 202 generated at the first time is referred as the first vehicle data. The vehicle data 202 generated as the vehicle 100 moves from the first position to the second position is referred as second vehicle data. Likewise, the vehicle data 202 generated as the vehicle 100 moves from the second position to the third position is referred as third vehicle data, and so on.

At block 324, the processor 116 has determined that at the second position, the vehicle 100 has moved a sufficient distance to generate another image 220 from the image data 196. That is, in one embodiment, the processor 116 has determined that the vehicle 100 has moved a predetermined distance 240 (FIG. 4A) using the vehicle data 202, and in response, the processor 116 causes the imaging device 108 to generate another image 220. For example, the predetermined distance 240 is 25 cm, but may range from 5 cm to 1 m. Additionally or alternatively, the processor 116 causes the imaging device 108 to generate another image 220 after a predetermined time period. For example, the predetermined time period is 2.0 seconds, but may range from 0.25 seconds to 5.0 seconds. In yet another embodiment, the processor 116 causes the imaging device 108 to generate another image 220 based on the wheel speed data 192 (i.e., the speed of the vehicle 100). In this embodiment, when the wheel speed data 192 indicates that the vehicle 100 is moving at less than a threshold speed, the images 220 are generated at a first rate; and when the vehicle 100 is moving at or above the threshold speed, the images 220 are generated at a second rate that is greater than the first rate. For example, when the vehicle 100 is moving at less than 5.0 mph the images 220 are generated every 2.0 seconds, and when the vehicle 100 is moving at 5.0 mph or more the images 220 are generated every 0.25 seconds. Such an approach results in the surround view image 224 being an accurate representation of the surroundings of the vehicle 100 without missing any obstacles 228 or other features. The processor 116 is typically configured to generate the images 220 at a rate that results in at least some overlap among sequential images (see FIG. 7, described below, overlap area 260). However, overlap amongst the images 220 is not required to form a suitable surround view image 224. If overlap is not present, then the surround view image 224 may have gaps in coverage.

In a further embodiment, the processor 116 causes the imaging device 108 to generate another image 220 when the vehicle 100 has moved a predetermined change in yaw position 204, as determined from the change data 206. The predetermined change in yaw position is 15° and may range from 5° to 30°. Thus, even when the vehicle 100 has not moved the predetermined distance 240 (i.e., a straight line distance), the next image 220 is generated when the vehicle 100 has sufficiently rotated about the yaw axis. This approach results in the images 220 having sufficient overlap to form the surround view image 224.

Figure 5:
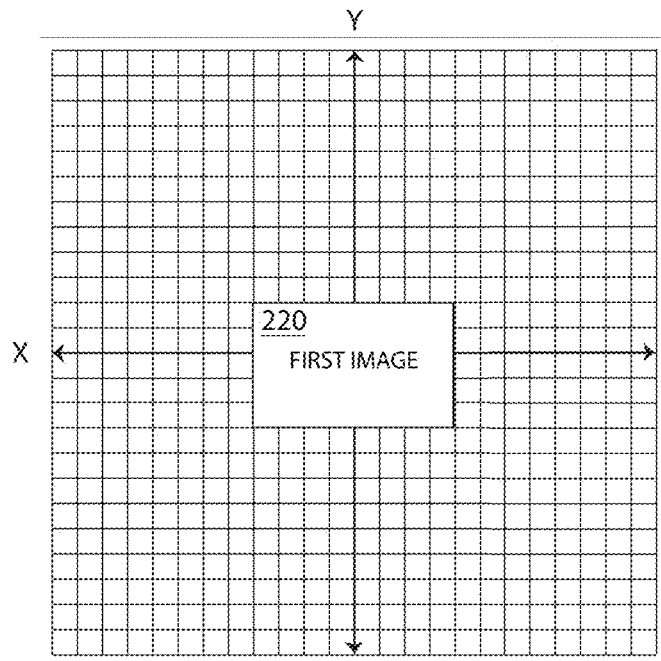
FIG. 5 illustrates a coordinate system and a first image generated by the surround view camera system of FIG. 1.

At block 328, after the system 104 has generated two of the images 220 and has received the vehicle data 202 from the first time to the second time (i.e., second vehicle data 202), the images 220 are combined to form the surround view image 224. This combination of images 220 is described with reference to the graphs of FIGS. 5-8. As shown in FIG. 5, the first image 220 is assigned to a reference location on the x-y coordinate system. The exemplary reference location places a center of the image 220 at the origin (0, 0) of the coordinate system. Another reference location may be used.

Figure 6:
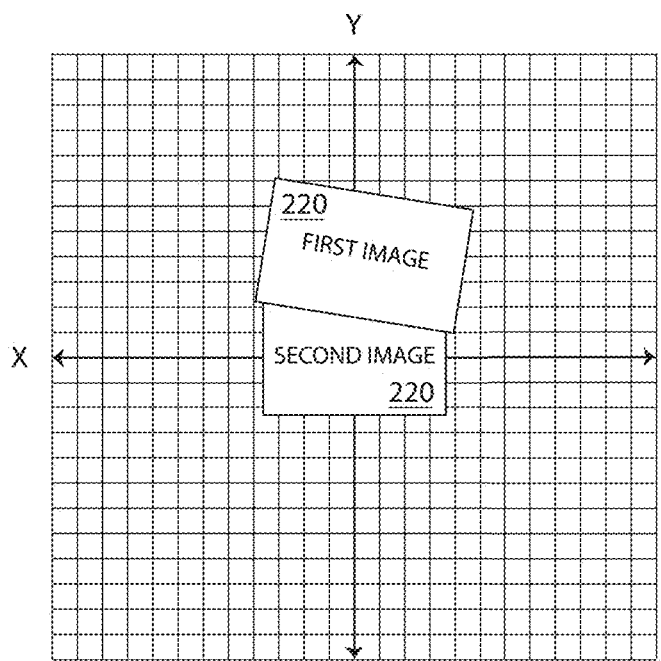
FIG. 6 illustrates the coordinate system of FIG. 5 and includes the first image after being repositioned relative to a second image generated by the surround view camera system of FIG. 1.

FIG. 6 illustrates that the image 220 generated at the second time when the vehicle 100 is at the second position has been added to the coordinate system. In FIG. 6, the second image 220 (from second image data 196) has been centered about the reference position (the origin), and the first image 220 has been re-positioned based on the change data 206. The change data 206 represents the distance moved and the change in yaw position 204 from the first position to the second position. Thus, in FIG. 6, the first image 220 has been rotated clockwise to compensate for the movement of the vehicle 100 about the yaw axis, and has been moved horizontally and vertically on the x-axis and the y-axis to compensate for the straight line distance moved by the vehicle 100. The rotation of the first image 220 is stored in the image data 196.

The concept in FIG. 6 is that by moving the first image 220 as described herein, the first and the second images 220 are combinable (after some additional processing) to result in a single larger image showing the surroundings of the vehicle 100. A similar process is sometimes described as "stitching" together images and is sometimes used to form a panoramic image from several smaller images, for example.

Figure 7:
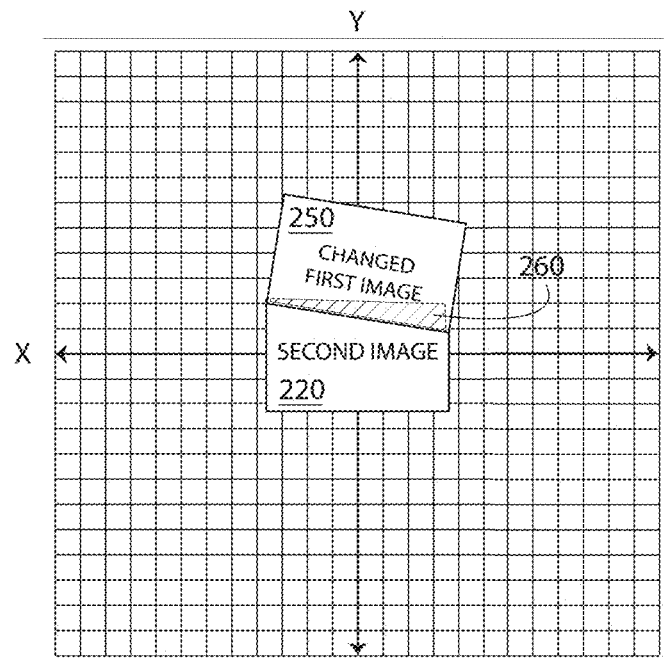
FIG. 7 illustrates the coordinate system of FIG. 5 and includes the first image after being resized relative to the second image to a changed first image.

Next at block 328 and with reference to FIG. 7, additional image processing is performed to change the first image 220 to a changed first image 250. The image processing includes resizing the first image 220 to have the same scale as the second image 220. This processing helps to show features in the surroundings of the vehicle 100 in a consistent and expected size. As shown in FIG. 6, in an example, the first image 220 illustrates the surroundings of the vehicle 100 in a scale that is larger than the second image 220 as shown by the larger size of the first image 220. Accordingly, to adjust for this difference in scale, the processor 116 is configured to scale (resize) the first image 220 to have the same scale as the second image 220. The resized first image 220 is the changed first image 250 and corresponding changed image data 254 is stored in the memory 112. Alternatively, the second image 220 could be resized to have the same scale as the first image 220.

Additional image processing may also be performed at block 328 including dewarping the first image 220, the changed first image 250, and/or the second image 220, when appropriate. Dewarping refers to reducing and/or eliminating distortion of an image caused by structural characteristics of the lens of the imaging device 108. Typically, dewarping is utilized when the imaging device 108 includes a fisheye lens, and is also referred to as fisheye dewarping. The processor 116 is configured to process the image data 196, 254 to perform the dewarping. The method 300 includes performing the dewarping, if required, prior to forming the surround view image 224. Changed image data 254 after the dewarping is saved to the memory 112. The dewarped image 220 is referred to as a rectified image.

The processor 116 is also configured to perspective correct the images 220, 250, when appropriate. Perspective correction is used to correct for the issue when objects in an image are distorted in size based on the distance of the object to the imaging device 108, with objects that are close the imaging device 108 being shown larger than appropriate and with objects that are far from the imaging device 108 being shown smaller than appropriate. The processor 116 is configured to process the image data 196, 254 to perform the perspective correction. The method 300 includes performing the perspective correction, if required, prior to forming the surround view image 224. Changed image data 254 after the perspective correction is saved to the memory 112.

Thus, at block 328, the processor 116 is configured to move, rotate, scale, dewarp, and/or perspective correct the first image 220 based on the change data 206 to generate the changed first image 250, which is shown in FIG. 7 and is saved to the memory 112 as the changed image data 254.

Figure 8:
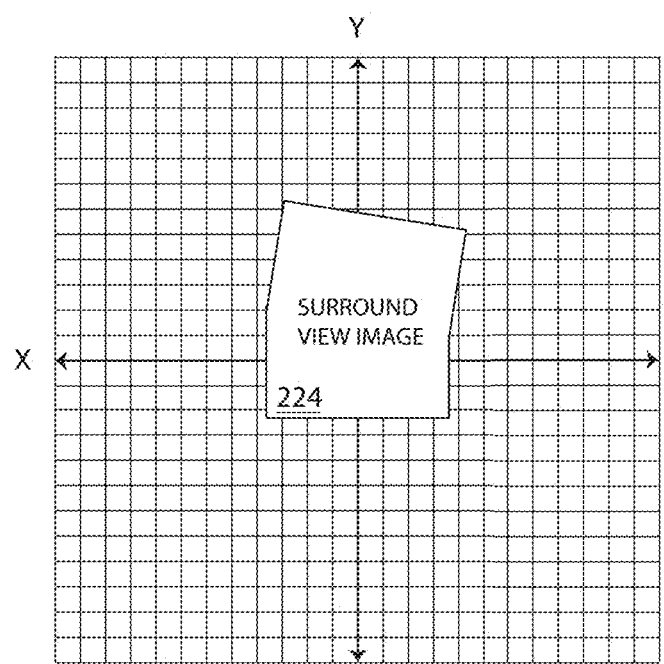
FIG. 8 illustrates the coordinate system of FIG. 5 and shows the surround view image formed by combining the changed first image and the second image.

Next, at block 332 the method 300 includes generating composite image data 198 corresponding to the surround view image 224 from the second image 220 and the changed first image 250. As shown in FIG. 8, the surround view image 224 is a combination of the second image 220 and the changed first image 250 that results from combining the changed image data 254 with the image data 196 of the second image 220. The combination eliminates an overlap area 260 from the changed first image 250 and this portion of the surround view image 224 is provided by the image data 198 of the second image 220. To combine the images 220, 250, after removing the overlap area 260, the adjacent boundaries of the images 220, 250 are digitally stitched together form a larger combined image that is the surround view image 224 and is stored as the composite image data 198 in the memory 112.

At block 336, the surround view image 224 is shown on the display screen 128, by transmitting the composite image data 198 to the display screen 128. An icon depicting the vehicle 100 is also shown on the display screen 128 so that the operator has an understanding of the location of the vehicle 100 in the surround view image 224. An operator of the vehicle 100 views the surround view image 224 and then operates the vehicle 100 to maneuver the vehicle 100 around obstacles 228 without driving into the obstacles 228. With reference to FIG. 4B, the surround view image 224 shows that the vehicle 100 is located at position 2, which is within the boundaries of the image 220 taken at position 1. This effect provides the apparent top-down view from images 220 generated by a single imaging device 108 located on the rear side of the vehicle 100.

From block 336, the method 300 returns to block 304 to determine if the surround view camera system 104 should remain activated. As shown in FIG. 4C, in this example, the surround view camera system 104 remains activated and the image 220 taken at position 3 (i.e., third image data) has been added to the surround view image 224, according to the method 300 that uses third vehicle data 202 from the second time to the third time. In one embodiment, the entire surround view image 224 is treated as the "first image" when subsequent images 220 are to be combined therewith. That is, the surround view image 224 is moved, rotated, scaled, dewarped, and/or perspective corrected based on the change data 206 from the second position to the third position to generate a changed surround view image and changed composite image data 254. The changed surround view image is combined with the image 220 generated at the third position of the vehicle 100, and a corresponding updated surround view image 224 is shown on the display screen 128. This process of changing the surround view image 224 and combining with the new image 220 is repeated for each new image 220 generated by the surround view camera system 104. The surround view image 224 is also referred to as a history image or as a combined accumulation of snapshots. Additionally, the surround view image 224 is referred to as a video texture.

In FIG. 4C, the vehicle 100 is located at position 3, which is within the boundaries of the image 220 taken at position 1 and the image taken at position 2. By showing the icon of the vehicle 100 moving through the previously-taken images 220 of the surround view image 224 the top-down view effect is achieved. As more images 220 are added to the surround view image 224, the effect becomes even clearer eventually resulting in a complete view 360° bird's eye view around the vehicle 100 after the vehicle 100 has moved a distance greater than its length.

The surround view camera system 104 requires only the one imaging device 108 to generate the surround view image 224 instead of the four or more imaging devices used with other systems. As noted, many vehicles already include a back-up camera or reversing camera. The surround view camera system 104 described herein is suitable to use the back-up camera and to transform the typical rear view shown on the display screen 128 to the surround view image 224 disclosed herein. Thus, the surround view camera system 104 and corresponding method 330 are an improvement to technology by providing a helpful additional camera view using a hardware element is already included on some vehicles.

Additionally, the surround view camera system 104 is an improvement over existing systems because the vehicle data 202 is used to combine the images 220. By determining the change data 206 between each image 220, the system 104 smoothly and accurately combines the images 220 with minimal hardware resources for any vehicle speed and for any steering input.

In another embodiment, the surround view camera system 104 includes an imaging device at the front of the vehicle 100 and at the rear of the vehicle 100. This configuration enables the surround view camera system 104 to generate the surround view image 224 when the vehicle 100 is moving in the forward and the reverse directions. Even in this embodiment, however, the surround view image 224 is generated from the image data 196 of just one of the imaging devices 108.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of operating a surround view camera system for a vehicle, the method comprising:
   generating first image data at a first time using an imaging device operably connected to the vehicle, the first image data corresponding to a first image of a surroundings of the vehicle;
   receiving first vehicle data generated by at least one sensor mounted on the vehicle with a processor, the first vehicle data generated at the first time, and the first vehicle data including a first steering angle of the vehicle;
   generating second image data at a second time after the first time using the imaging device, the second image data corresponding to a second image of the surroundings of the vehicle;

receiving second vehicle data generated by the at least one sensor with the processor, the second vehicle data generated from the first time to the second time, and the second vehicle data including a second steering angle of the vehicle;

processing the first vehicle data and the second vehicle data using the processor to determine change data corresponding to a change in position of the vehicle from a first position at the first time to a second position at the second time, the change data including yaw data of the vehicle as determined from the first steering angle and the second steering angle, the yaw data corresponding to a change in yaw position of the vehicle from the first position to the second position;

generating composite image data using the processor by (i) moving, rotating, and/or scaling the first image based on the change in position of the vehicle, as determined from the change data including the yaw data, to generate a changed first image as represented by changed first image data, and (ii) combining the changed first image data with the second image data; and displaying a surround view image from the composite image data on a display screen of the vehicle.

2. The method according to claim 1, further comprising:
generating third image data at a third time after the second time using the imaging device, the third image data corresponding to a third image of the surroundings of the vehicle;

receiving third vehicle data generated by the at least one sensor mounted on the vehicle with the processor, the third vehicle data generated from the second time to the third time;

processing the third vehicle data and the second vehicle data using the processor to determine change data corresponding to a change in position of the vehicle from the second time to the third time;

generating updated composite image data using the processor by (i) moving, rotating, and/or scaling the surround view image based on the change in position of the vehicle from the second time to the third time to generate a changed surround view image as represented by changed composite image data, and (ii) combining the changed composite image data with the third image data; and displaying an updated surround view image from the updated composite image data on the display screen.

3. The method according to claim 1, wherein:
the first vehicle data and the second vehicle data includes a vehicle speed,
the processor determines distance data of the vehicle based on the vehicle speed, and
the distance data is included in the change data and corresponds to a distance moved by the vehicle from the first position to the second position.

4. The method according to claim 1, further comprising:
generating the first image in response to detecting that the vehicle is in a predetermined drive state.

5. The method according to claim 1, wherein the surround view image corresponds to a top-down view of the surroundings of the vehicle from the first time and the second time.

6. The method according to claim 1, wherein:
the processor is configured (i) to dewarp the first image and the second image, and/or (ii) to perspective correct the first image and the second image prior to generating the composite image data.

7. The method according to claim 1, further comprising:
generating the second image data after the processor determines that the vehicle has moved a predetermined distance based on at least the second vehicle data.

8. The method according to claim 1, further comprising:
generating the second image data after the processor determines that the vehicle has moved a predetermined change in yaw position based on at least the second vehicle data.

9. The method according to claim 1, wherein the imaging device is mounted on a rear side of the vehicle.

10. A surround view camera system for a vehicle, comprising:
an imaging device mounted on the vehicle and configured (i) to generate first image data at a first time, the first image data corresponding to a first image of a surroundings of the vehicle, and (ii) to generate second image data at a second time after the first time, the second image data corresponding to a second image of the surroundings of the vehicle;

a sensor mounted on the vehicle and configured to generate first vehicle data at the first time and second vehicle data at the second time, the sensor including a steering angle sensor configured to generate first steering angle data corresponding to a steering angle of at least one wheel of the vehicle at the first time and second steering angle data corresponding to the steering angle of the at least one wheel of the vehicle at the second time;

a display screen mounted on the vehicle; and a processor operably connected to the imaging device, the sensor, and the display screen, the processor configured to:
receive the first vehicle data and the second vehicle data including the first steering angle data and the second steering angle data,
process the first vehicle data and the second vehicle data to determine change data corresponding to a change in position of the vehicle from a first position at the first time to a second position at the second time, the change data including yaw data of the vehicle as determined from the first steering angle data and the second steering angle data, the yaw data corresponding to a change in yaw position of the vehicle from the first position to the second position,
receive the first image data and the second image data,
generate composite image data by (i) moving, rotating, and/or scaling the first image based on the change in position of the vehicle, as determined from the change data including the yaw data, to generate a changed first image as represented by changed first image data, and (ii) combining the changed first image data with the second image data, and
transmit the composite image data to the display screen,
wherein a surround view image from the composite image data is displayed on the display screen of the vehicle.

11. The surround view camera system according to claim 10, wherein:
the sensor further includes a wheel speed sensor configured to generate wheel speed data corresponding to a speed of the vehicle,
the processor is configured to generate distance data based on the wheel speed data,
the processor is configured to generate the yaw data based on the first steering angle data, the second steering angle data, and the distance data, and the change data includes the distance data and the yaw data.

12. The surround view camera system according to claim 11, further comprising:
a drive state sensor operably connected to a transmission of the vehicle and to the processor, the drive state sensor configured to generate drive state data corresponding to a drive state of the vehicle,
wherein the processor is configured to generate the first image in response to detecting that the vehicle is in a predetermined drive state from the drive state data.

13. The surround view camera system according to claim 10, wherein the imaging device is mounted on a rear side of the vehicle.

14. The surround view camera system according to claim 10, wherein the surround view image corresponds to a top-down view of the surroundings of the vehicle from the first time and the second time.

15. The surround view camera system according to claim 10, wherein:
the processor is configured (i) to dewarp the first image and the second image, and/or (ii) to perspective correct the first image and the second image prior to generating the composite image data.

16. A method of operating a surround view camera system for a vehicle, the method comprising:
generating first image data at a first time using an imaging device operably connected to the vehicle, the first image data corresponding to a first image of a surroundings of the vehicle;
generating second image data at a second time after the first time using the imaging device, the second image data corresponding to a second image of the surroundings of the vehicle;
receiving vehicle data generated by at least one sensor mounted on the vehicle with a processor, the vehicle data generated from the first time to the second time;
processing the vehicle data using the processor to determine position data corresponding to a change in position of the vehicle from the first time to the second time;
generating composite image data using the processor by (i) moving, rotating, and/or scaling the first image based on the position data to generate a changed first image as represented by changed first image data, and (ii) combining the changed first image data with the second image data; and
displaying a surround view image from the composite image data on a display screen of the vehicle,
wherein the second image data is generated in response to the processor determining that the vehicle has moved a predetermined distance based on the vehicle data.

17. The method according to claim 16, wherein the surround view image corresponds to a top-down view of the surroundings of the vehicle from the first time and the second time.

18. The method according to claim 16, wherein:
the processor is configured (i) to dewarp the first image and the second image, and/or (ii) to perspective correct the first image and the second image prior to generating the composite image data.

* * * * *